Sept. 1, 1936.　　　　G. T. REICH　　　　2,053,111
MULTIPLE EFFECT DISTILLATION OF ALCOHOL CONTAINING MEDIUMS
Filed Feb. 24, 1934　　　2 Sheets-Sheet 1
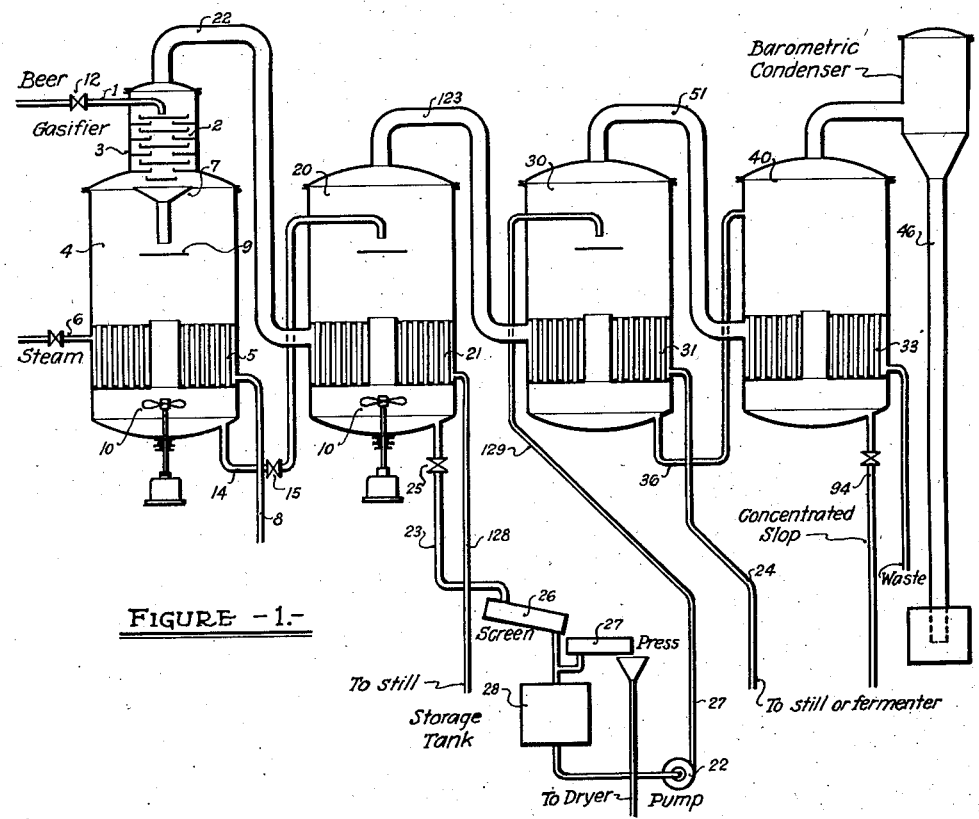
FIGURE -1.-
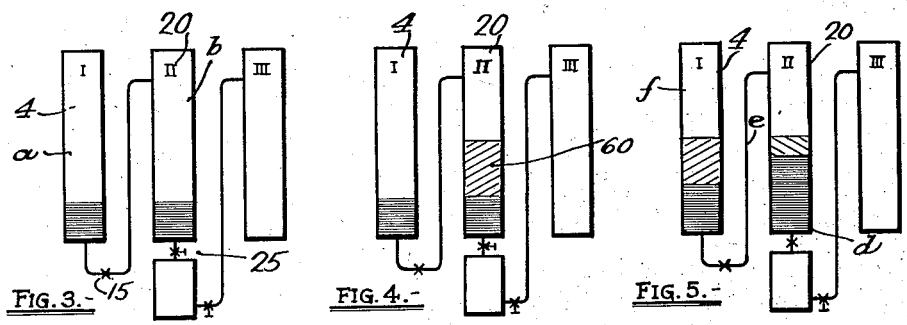
FIG. 3.-　　FIG. 4.-　　FIG. 5.-
x Valve open.
✻ Valve closed.
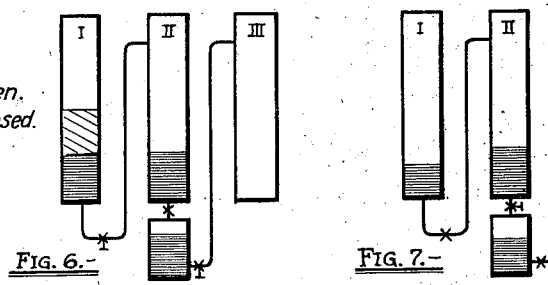
FIG. 6.-　　FIG. 7.-
Inventor
Gustave T. Reich
By Mark W. Collet
Attorney

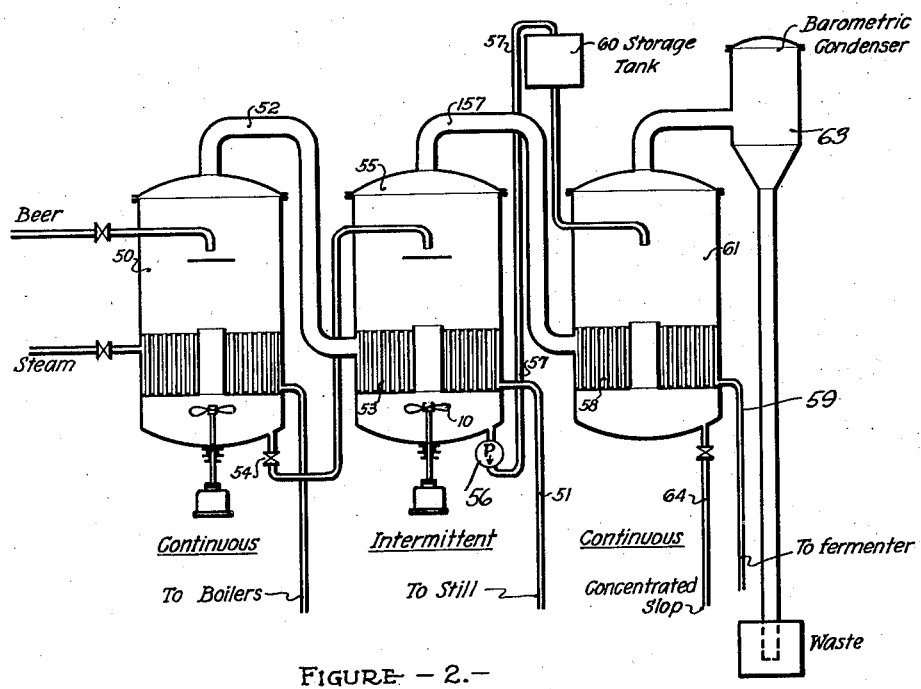
Figure — 2.—
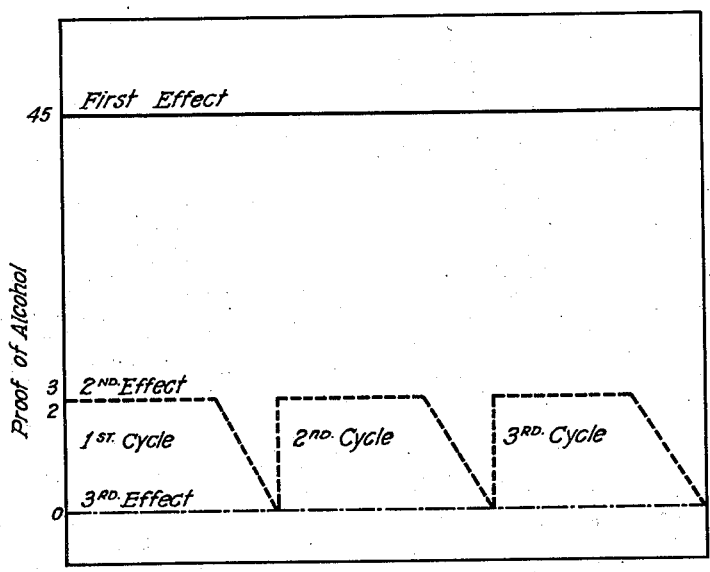
Figure — 8.—

Patented Sept. 1, 1936

2,053,111

UNITED STATES PATENT OFFICE 2,053,111

MULTIPLE EFFECT DISTILLATION OF ALCOHOL-CONTAINING MEDIUMS

Gustave T. Reich, Philadelphia, Pa.

Application February 24, 1934, Serial No. 712,792

5 Claims. (Cl. 202—45)

My invention concerns the treatment of fermented materials for the formation of alcoholic products. These fermented materials are denominated in the trade by the name of beer. My process is carried on in multiple effect evaporators wherein the atmospheric pressure in the successive effects diminishes and also the temperature is lessened in the successive effects.

This general form of process is set forth in my Patent No. 1,599,185 and in my application bearing the Serial No. 568,637 filed October 13, 1931. Both of these set forth processes that are advances on the art as known previously. The present invention is applicable as an improvement on these processes, but its usefulness is not limited to this, as it has many advantages and novel features that may be utilized entirely independently of them.

The process contains two cycles or phases. In the first, the liquid level in the first effect remains at a fixed level so that the liquid level in the second effect does not reach above a desired level, although the level in the second effect approaches continuously the afore-mentioned desired level, so long as the flow of liquid from the first to the second effect is permitted. This results from the existence of a greater than atmospheric pressure in the first effect, and a lesser vapor pressure in the second effect. The next cycle is the filling up of the first effect to a determined level from the continuous in-flowing beer stream. This is effected by preventing the flow of liquor from the first to the second effect. Evaporation from the first effect is always continuous, and the product uniform in both quantity and proof; while the second effect is de-alcoholized with varied proof but constant vapor volume.

In my process the alcoholic vapors produced in the first effect as they leave the first effect, maintain a constant proof; and the liquid in the first effect remains preferably at constant proof. The recovery of the alcohol from the beer occurs as the beer enters the first effect, so that the liquid, which accumulates in this effect, remains preferably at a constant proof in spite of its constant increase in quantity. And the liquid that enters the 2nd effect is at this constant proof but the proof of this liquid changes as the evaporation in the second effect and the proportion of alcohol in the liquor contained in this effect diminishes until practically all the alcohol in the liquor is eliminated from it. During the evaporating in the 2nd effect no liquid is either added or withdrawn from this effect. After the evaporation of the alcohol is concluded in the second effect, the charge is withdrawn; it consists substantially of a dealcoholized slop which is concentrated in subsequent steps of my process.

My process has among its objects evaporating in the first effect preferably 95% of or nearly all of the alcohol in the beer, a much nearer approach to a high unvarying proof alcohol in the condensate derived from the vapors given off by the first effect; removing from the liquor from which the alcohol has been evaporated, the suspended solids, before this liquor is conveyed to the effect succeeding. If this removal is accomplished fully only a clear liquid containing dissolved but not suspended solid will pass into the succeeding effect and the suspended solids will be removed and treated separately. This reduces materially the bulk of liquor to be evaporated in these subsequent effects. Other objects will appear in the subsequent part of this specification but I do not bind myself to a process in which all of these objects are attained provided novel features in my process are employed to attain even one of them.

From a purely commercial standpoint my invention is also important. It can be carried out with the use of less floor space, a smaller investment is necessary, more favorable evaporation gives greater economy of operation, and other commercial advantages that will show themselves on a further reading of this specification.

Important features of my invention are these. The level of the liquid in the first effect changes periodically. The level of the liquor in the second effect also changes periodically. Preferably the level of the liquor in the subsequent effect is as substantially constant as is the usual case in the process. The change in level in the first effect occurs during the alcoholic evaporation from this effect. It is a gradually rising level, produced preferably by allowing a constant flow into the first effect accompanied by a closing off of the outflow of the liquor therefrom. The changes in level of the liquor in the second effect is quite different. The level of the liquid in it is maintained during the evaporation in this effect, at a constant level except so far as lowered by the evaporation, and the lowering of the level occurs through the drawing off of the liquor after this evaporation (practically alcohol free) to a low level and the subsequent transfer to this second effect of the bulk of the liquor remaining in the first effect after the alcoholic evaporation therefrom has been completed. Any outflow from the secondary effect is prevented in practice during the transfer of the liquor from the first to the second effect, and when this transfer is effected, the level of the liquor in the first effect is lowered to a great extent, and the level of the liquor in the second effect will rise to the level appropriate for the evaporation step in the latter that has been referred to above.

The transfer of the liquor from the first effect to the second then stops, and the evaporation of the constantly increasing liquor content of the first effect occurs as above mentioned. It is possible to carry on these steps mentioned with reference to the first effect without employing those mentioned in the second effect and vice versa, but up to the present so doing is not as advantageous as combining them. A slow gradual addition of beer to a quantity already in the first effect without any withdrawal seems, while the evaporation proceeds, most efficient, and removes nearly all the alcohol, usually about 95% and removes it at about 50 proof. I introduce the beer first into the effect that is at the highest temperature and pressure.

An important feature of my process which may be practiced in connection with the steps referred to above is the de-gassing of the beer. The beer that is fed into the first effect contains in it a quantity of $CO_2$ gas which causes much foaming especially when the beer is evaporated by heating. In my process, when this step is included, the beer enters the primary effect as it passes or after it has passed through some apparatus wherein the beer is finely comminuted. As it flows into the first effect, and before it reaches the level of the liquor in this effect, a great portion of the $CO_2$ gas separates from the beer. The evaporated alcoholic vapors carry this off with them. Usually, heat and comminution of the beer will cause the $CO_2$ gas to be eliminated freely in the upper part of the first effect from which the vapors from the beer will carry it off with them. Any carbon dioxide gas that is contained in the beer that reaches the liquid level in the first effect will also, in practice, pass off with the alcoholic vapors without producing unmanageable foaming.

In my process, the evaporation in the effects subsequent to the first and second, may be performed in any suitable way. I prefer that they be kept at constant level and that a constant in and out flow be maintained in them in any usual or convenient manner.

At a stage of my process following the evaporation in the second effect, I may strain out the suspended solids. This I can accomplish by almost any suitable apparatus. I may use a filter press, or a centrifugal, or a strainer followed by a press, or other conventional means by which the suspended solids are separated from the liquor until it contains only solids in solution.

I will now describe two methods of carrying out my invention, each in conjunction with a suitable apparatus, prefacing, however, that the invention is not to be taken as limited to these concrete examples, which are given merely to make it more readily understood.

Fig. 1 is a diagram showing a very complete apparatus, in which my invented process may be carried out in a more elaborate and I believe more complete and satisfactory form. Fig. 2 is a diagram showing a simple form of apparatus. Figs. 3, 4 and 5, and 6 are diagrams illustrating the stages of my process as they succeed each other.

The process as carried on in the apparatus shown in Fig. 1 is as follows:—

The beer is fed continuously by conductor 1 in which is a control valve into the first effect, 4, of the evaporator, the effect in which the evaporation occurs while the level of the liquor rises. It is degassed by passing through the gas eliminator, 3, positioned so that the beer will pass through it before reaching the effect, 4. This gas eliminator is provided with devices for dispersing into a finely divided state, the beer sufficiently in conjunction with the heating it is subjected to, to disengage the $CO_2$ gas from the beer without the loss of alcohol. For this purpose baffles, 2, may be used. The $CO_2$ gathers in the upper part of the effect, 4, and is carried off by the vapor evaporated from the beer. A funnel 7 or other means may be positioned to catch the drippings from the gas eliminator, 3, and the drippings may be discharged from it onto a plate, 9, that distributes them so that they will fall directly on the heating unit (calandria), 5, and give off almost all of the alcohol content of the beer before reaching the lower part of the effect, 4. Devices for making the effect, 4, operative may be the calandria, 5, through which is fed live or exhaust steam by a pipe, 6, and an exit pipe, 8, an outlet vapor conductor, 22, may be used through which the alcoholic vapors and the $CO_2$ may pass off; the agitator, 10, for the liquid at the bottom of the effect, 4; the steam exhaust pipe, 8, and means for carrying the liquid from the first to the second effect such as the pipe, 14, containing the control valve, 15.

The second effect receives the almost de-alcoholized liquid consisting of a constant low proof alcohol from the first effect 4, and maintains an even rate of evaporation in the second effect until a pre-determined liquid level in the second effect is reached. When valves 15 and 25 are both closed, and the evaporation continued the liquid in the second effect will be completely de-alcoholized.

During the de-alcoholizing in the second effect, when valves 15 and 25 are both closed, the liquid level in the first effect is raised to a pre-determined level, while the constant feed of fermented beer is fed into it, producing a constant amount of vapors at a constant proof, and removed through vapor line, 22. By the time the pre-determined liquid level in the first effect is reached, the liquid in the second effect is completely de-alcoholized. The de-alcoholized liquid in the second effect is lowered by opening valve 25. By closing valve 25, and opening valve 15, the suction, or other liquor moving means, will draw liquor from the first effect into the second effect, caused by the condensation in the calandria of the next effect, lowering the liquid level in the first effect to the desired level, while maintaining the constant feed of fermented beer, constant proof of alcohol and vapors, and constant low proof alcohol in the liquid of the first effect.

The second effect, 20, may have a calandria, 21, to which the hot vapors from the primary effect, and from which the condensate, passes to the still, for instance through a pipe, 128. The $CO_2$ will be separate from the condensate and may be collected in any convenient manner.

The liquor from the first effect may be distributed or comminuted similarly to the distribution and the comminuation of the beer in the first effect, the funnel and plate being utilized.

In the apparatus shown in Fig. 1, I utilize a separator mechanism to remove the suspended solids from the liquor that is passing the second effect. In practice, this is a strainer, 26, (or some other separator) and the press, 27. The latter squeezes out the liquid remaining in the strained out solids. This liquid may be added to the liquid from the strainer; as between 40% and 60% of the beer has been evaporated in the effects 4 and 20 a liquor containing the dissolved solids concentrated usually to ½ or less of the original bulk of the beer, will remain.

Intermediate between the effect 20 and the following effects are means for equalizing the flow into the third effect, 30, in which preferably the inflow and outflow are regulated to keep the liquor in it at a constant level. I may use for this purpose, a storage tank, 28, that may be large enough to contain the entire outflow from effect 20. A pump, 22, or other suitable means may feed the liquor through pipe, 129, into effect 30. The vapors from effect 20 are led through pipe 123 into the calandria, 31, of effect 30, which they heat, and their condensate, containing a small portion of alcohol, is distilled, led to the fermenter or otherwise disposed of.

The vapor from the third effect, 30, (which is water) passes through pipe 51 to the calandria, 33, where it heats the liquid in effect 40, and flows off and is wasted. The vapors generated in effect 40 may pass into a barometric mechanism, 46, and be wasted. The concentrated slop from effect 40 passes through pipe 94. The agitator, 10, may be positioned in the effects where the liquid contains suspended matter, or in one of them as convenient.

In many cases, the prime cost of apparatus is an important factor, and for such purposes a number of the steps, which though very useful are not indispensable, may be omitted. The operation of the evaporators is analogous and accordingly merely a very brief description is given of this apparatus, which is shown in Fig. 2.

The dealcoholized material from effect 50 is drawn directly into effect 55, which is heated by the vapors carried to the heating coils, 53, by the conductor, 52. These vapors pass, after giving up heat in the calandria, 53, by a pipe, 51, to a still. In this form, the valve, 54, regulates and controls the levels of the liquid in the effects 50 and 55. The slop in the effect 55, is pumped directly into a storage tank, 60, by the pump, 56, through the pipe, 57, the vapors from effect, 55, pass through pipe 157, to coils 58, and pipe 59, to waste or fermenters and the slop from the tank 60, passes into the effect, 61, and is further evaporated and the vapors carried to a barometric condenser, 63. The concentrated slop may be drawn off by the pipe 64, and suitably treated. This last form of device may be very conveniently used where prime cost is a large consideration.

However, my invention is not limited to either of the concrete examples stated above, as many changes may be made in details of the process, and various different apparatus may be employed in carrying it out.

Figures 3, 4, 5 and 6 exhibit graphically the various stages of my process in the first two effects, those marked 4 and 20.

The phases are those occurring when the process is operating continuously.

Figure 7 shows graphically the process in which the third effect is introduced.

In Figure 3 is shown diagrammatically the condition of the liquids before the process starts. The valve 15 is opened and the valve 25 is closed. A portion of the liquid is shown in each of the effects 4 and 20. The introduction of the beer then takes place and the suction in effect 20 continuously draws up the liquor from effect 4 in which the level of the liquor (shown by the horizontal lines) remains substantially constant, and the liquor level in effect 20 rises. The portion of liquor above that originally contained in effect 20 is shown by lines drawn at an angle of 60 degrees in effect 20. This phase is shown in Fig. 4. During both of these phases evaporation takes place.

In Fig. 6, a succeeding phase is indicated. The valve 15 is closed. The valve 25 is open and the level of the liquor in effect 4 rises through the continuous flow into this effect of the beer. Meanwhile, the level of the liquor in effect 20 is lowered and passes into a storage tank.

In Fig. 5 is shown the intermediate positions of the liquid between their levels in Fig. 4 and their levels in Fig. 5.

Fig. 7 shows diagrammatically the filling up partly of the effect 30 from the storage tank.

I claim:

1. The continuous process of evaporating alcohol from an ethyl alcohol fermented beer in a multiple effect evaporator, wherein the first effect is indirectly heated by steam and each following effect indirectly heated by the vapors from the preceding effect, which comprises continuously introducing a constant composition fermented beer into said heated first effect in a finely comminuted form at such a rate as to produce constant proof vapor comprising substantially all the alcohol introduced, withdrawing continuously liquid residue from said first effect and discharging same into said second effect until the liquid rises in the second effect to a predetermined level, preventing further liquid withdrawal from the first effect, thus causing the existing liquid level in said first effect to rise to a predetermined level, preventing liquid withdrawal from the second evaporator while vaporizing all of the alcohol from the liquid present, then removing de-alcoholized liquid from the second effect and thereafter similarly repeating the above procedure in such a manner that the level differential between said existing level of the first effect and said predetermined level of the second effect allows the liquid in the second effect to be completely de-alcoholized while the liquid in the first effect is rising to said pre-determined level of the first effect.

2. The process defined in claim 1 wherein carbon dioxide contained in the beer is liberated while said beer is in said finely comminuted form and carried away along with the constant proof vapor produced in the first effect.

3. The process defined in claim 1 wherein any suspended particles of material introduced into the first effect with the beer are passed with the liquid residue thereof into and through the second effect and removed from the residual liquid of said second effect.

4. The continuous process of evaporating alcohol from an ethyl alcohol fermented beer in a multiple effect evaporator wherein the first effect is indirectly heated by steam and each succeeding effect by vapors produced in its immediately preceding effect, which comprises passing the beer, together with any suspended particles of material therein, to the first and second effect, then separating said suspended particles and those produced during the evaporation in the two effects from the residual liquor of the second effect, then removing any liquid occluded in said separated material and adding it to said suspended particle-free residual liquor.

5. The process of operating a multiple effect evaporator, the first effect of which is indirectly heated by steam and each subsequent effect by vapors produced in its immediately preceding effect to recover ethyl alcohol from a fermented liquor which comprises continuously introducing said fermented liquor into the first effect, producing a distillation of vapor therein, passing said vapor into the indirect heating means of the second effect, continuously discharging the residual liquor from said first effect into said second effect until it is filled to a predetermined level, stopping said discharge whereby the first effect fills to a predetermined level and the level of liquor in the second effect is lowered to a predetermined level by evaporation and simultaneously thereafter subjecting both said effects to alternating changes of liquid level, the lowering of level in one effect occurring simultaneously with the rising of level in the other effect.

GUSTAVE T. REICH.